April 27, 1943.  W. WORTH  2,317,427

VISCOSITY CONTROL VALVE

Filed April 26, 1939

INVENTOR
WELDON WORTH
BY Edgar M. Snodgrass
Wade Koontz
ATTORNEYS

Patented Apr. 27, 1943

2,317,427

UNITED STATES PATENT OFFICE 2,317,427

VISCOSITY CONTROL VALVE

Weldon Worth, Dayton, Ohio

Application April 26, 1939, Serial No. 270,141

17 Claims. (Cl. 137—144)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for controlling the flow of lubricant to a point of lubrication through a lubricant cooler, the control being dependent upon the viscosity of the lubricant, and is particularly useful although not limited to a heat exchange system of the kind described in my copending application Serial No. 88,413, filed July 1, 1936. In my copending application I described a lubricating system having a heat exchange and a viscosity control valve in which a viscosity means is provided for establishing a fluid pressure as a function of the viscosity of the lubricant which pressure cooperates with a predeterminately loaded valve for regulating the flow of the lubricant to said heat exchanger and in which provision is made to by-pass the lubricant around the heat exchanger when the viscosity responsive pressure corresponds to that obtained with a relatively high viscosity value of the lubricant.

In the particular viscosity valve illustrated and described in my copending application, the viscosity pressure responsive predeterminately loaded valve is so constructed and arranged as to be uninfluenced by the pressure of the lubricant in the chamber which is commonly communicatively connected with the different inlets to the heat exchange device, the viscosity chamber and the by-pass, the operation of said valve being dependent upon the difference in pressure between the loading on one side of the valve and the viscosity pressure of constant index on the other.

According to the present invention, a viscosity valve in which a chamber is commonly communicatively connected with the inlets of a heat exchange device, a viscosity pressure chamber and a by-pass, comprises valve means for regulating the lubricant flow to the heat exchange device as a function of the viscosity of the lubricant, the arrangement of the regulating valve in relation to the common chamber and the viscosity pressure chamber being such that the valve will be actuated by a difference in pressure between the loading of said valve and the viscosity pressure on one side thereof and the pressure of the lubricant in the common chamber on the other, and further valve means in the by-pass so constructed and arranged as to provide a relief for the lubricant in the common chamber when the pressure in said chamber reaches a predetermined value and for maintaining a more or less constant maximum pressure value for varying rates of lubricant flow through said common chamber to provide a constant inlet pressure for the viscosity responsive pressure producing means and to provide a constant reference pressure against which this viscosity responsive pressure acts by the operation of the said regulating valve.

The object of my invention is to provide a relief valve with the above described arrangement that will accurately limit or regulate the maximum pressure.

A further object of my invention is to provide in a viscosity valve of the type described, a unitary viscosity means that is readily detachably connected to the common chamber.

Other objects, novel features and advantages of this invention will be apparent from the following specification and accompanying drawing wherein.

Figure 1:
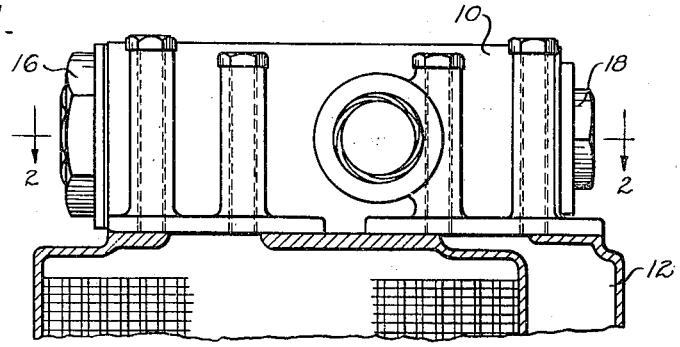
Figure 1 is a front elevational view of a viscosity valve embodying my invention, the valve being assembled with a heat exchange device shown broken away and in section.

The invention is utilized in a lubricating system generally as described in the specification of my above referred to application and is shown as embodied in a unitary structure 10 that is detachably connected by means of bolts to a heat exchange device 12. The unitary structure essentially consists of a housing 14, preferably in the form of a casting having an inlet and two outlets, respectively, the former being in communication with the heat exchange device and the latter with a by-pass. The housing is formed with threading openings at opposite ends to receive end plugs 16, 18 and is also formed with an inwardly presenting elongated annular abutment which serves to partition the housing into two end fluid pressure chambers 20—22, chamber 22 of which may be referred to as a supplemental fluid pressure chamber, and an intermediate main or common fluid pressure chamber 24 which are respectively in communication with the outlets 26—28 and inlet 30. The left and right hand ends of the abutment or partition are fitted with valve seats 32—34 that constitute openings that are controlled by poppet valves 36—38 for regulating the flow of lubricant from the common chamber through the regulating valve to the heat exchanger and/or through the by-pass chamber. The regulating valve is formed with a hollow stem to receive in sliding relation a hollow extension 40 of the end plug, the adjacent ends of the valve stem and end plug extension being inwardly and outwardly extending flanges 42—44 respectively that guide the movement of the valve. The spring 46 is interposed between the valve 36 and the inner end of a tension adjusting nut 48, the valve 36 being thus held against the valve seat 32 with a predetermined spring loading. A bellows 50 is interposed between and connected in sealed relation at one end to the valve and at the other end to the inner end of the end plug 16, the space enclosed by said bellows constituting a viscosity pressure chamber.

The by-pass relief or outlet valve 38 is formed with a valve stem 52 that is slidably received in hollow guide stem 54 made integral with the end plug 18 and is yieldingly held against the valve seat by means of an actuating spring 56 interposed between the valve and the end plug and mounted on the stem. The head of valve 38 is provided with a portion constituting an increased area over that area defined by seat 34, which increased area overlaps the valve seat and is exposed to the fluid pressure by the unseating movement of the valve to compensate for increased tension of its actuating spring by such movement. This spring is compressed to a predetermined loading that is greater than the predetermined spring loading of the valve 36. The valve seat is formed with a conical bore concentric with the opening and converging towards the common chamber. This conical bore cooperates with a flaring flange formed on the valve head to variably restrict the flow therethrough in a manner hereinafter described more in detail.

A viscosity device or plug, having an expanding fluid passage or discharge conduit 74 and a viscosity pressure conducting passage 61, is threadedly received in the side wall of the casing and extends into the chamber. The expanding passage is in the form of a venturi, having the point of maximum restriction at the inner end of the plug and having the point of maximum effective opening at the outer end. This Venturi passage is communicatively connected with the chamber through passages 58—60 formed in the wall of the casing. The passage or branch conduit 61 is communicatively connected to the pressure viscosity chamber 20 by means of passages 62—64 and formed in the casing wall openings, an annular passage 66 and a series of radial passages formed in the end plug 16 and a further annular passage 68 and a series of radial passages 70 and an axial bore formed in the end plug or tension nut 16. The longitudinal dimension of the groove in the adjusting nut constituting the annular passage is such that for all positions of adjustment of the nut 48 it will register with the radial passages 70 of the end plug. The viscosity plug is provided with a screen 72 at the inner end, which screen is readily removable with the plug whenever it is desired to clean same.

Figure 2:
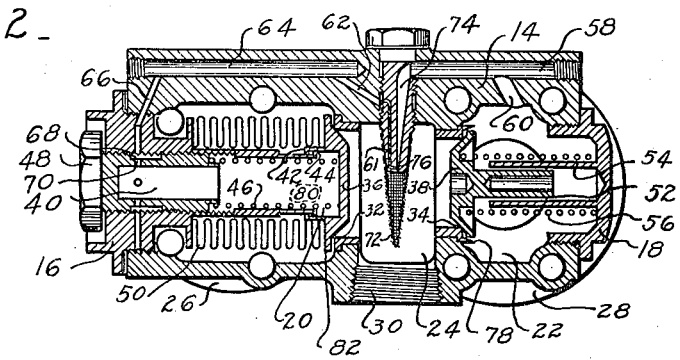
Figure 2 is a sectional view taken on the line 2—2 of Figure 1.
Figure 4:
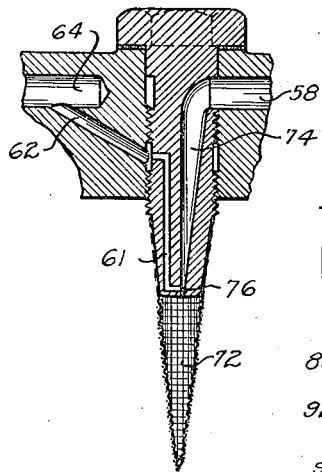
Figure 4 is a detail view showing parts in section and broken away.
Figure 3:
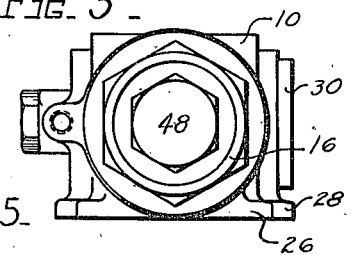
Figure 3 is an end view of the viscosity valve looking from left to right.
Figure 5:
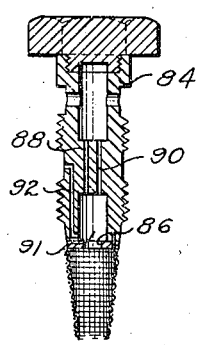
Figure 5 is a further variation of a detail of my invention.

A further variation of viscosity plug 84 is shown in Fig. 5. This plug is similar to the viscosity plug shown in Figs. 2 and 4, except that, instead of utilizing a Venturi passage 74 for obtaining the viscosity pressure, the plug 84 is provided with an orifice 86 and a plurality of friction or metering tubes or channels 88—90, the orifice serving the purpose of the throat restriction and the friction channels serving the purpose of the expanding portion of the venturi. The viscosity pressure is taken at the point 91 and conducted to the viscosity pressure responsive valve 80 through conduit 92 in a manner similar to that shown in Fig. 2.

The operation of the viscosity control valve is as follows:

Oil is drawn from the engine sump (not shown) by a pump (not shown) and is delivered through a suitable conduit (not shown) to the entrance or common chamber 24. Oil passes through the dirt protecting screen and through the expanding Venturi passage 74 to the low pressure side of the relief valve 38 through passages 58—60 and into chamber 22. The pressure at the throat 76 of the Venturi passage with respect to the pressure in the entrance chamber will vary with the flow through said passage, being less than the entrance pressure by an amount equal to approximately the velocity head plus the entrance flow losses. Thus, since the flow through the Venturi passage varies according to the viscosity of the oil, the pressure at the throat varies as the viscosity. Since the flow would vary inlet pressure in the entrance chamber, a constant inlet pressure is obtained by regulating the oil flow through valve 38, thereby regulating the pressure in the entrance chamber to a substantially constant value when the control valve 36 is closed or partially opened and regardless of the quantity of oil flowing through the viscosity valve. It will be seen that, if the pressure in the entrance chamber exceeds the pressure of the spring 56 times the valve area when the valve is sealed at its primary seat at point 34, the valve will move to the right, thereby opening the valve and thus regulating the flow to maintain constant the pressure in the entrance chamber. As the flow through the valve increases, the valve is moved slightly farther to the right, producing with its secondary seat 78, which includes a flaring rim, a varying restriction with an increased effective valve area such that pressure in the entrance will be maintained substantially constant. The area of the valve 38 exposed to the pressure in the entrance when in the secondary seat position is greater than when in the primary seat position by an amount necessary to hold the valve spring 56 in the proper increased amount of compression to allow a greater opening of the valve without substantially changing the constancy of the entrance chamber pressure. The amount of area compensation is controlled by the angle and clearance of the tapered part of the seat with relation to the valve. This double seat arrangement may also be used to compensate for other factors that would prevent a constant pressure variation with flow.

This throat pressure is conducted to the viscosity pressure chamber 20 through the various communicating passages 62, 64, 66, 68, 70 and cooperates with the spring pressure to control the opening or closing of the regulating valve depending upon whether the combined viscosity pressure and pressure of spring 46 is less or greater than the pressure of fluid in the entrance chamber acting on the opposite side of the valve. It will thus be seen that it is the viscosity pressure which regulates the flow through the opening.

When the oil is cold, oil will flow from the engine to the source of supply (not shown) through the opening 30 and will also flow to the chamber 22 through the expanding or Venturi passage. The viscosity pressure produced at the throat 76 will be high since the oil flow through the passage will be slow due to the high viscosity of the oil. However, as the oil flow in the system warms up and becomes of lower viscosity, oil will then flow faster through the Venturi passage, thus decreasing the pressure at the throat 76 and in the viscosity pressure chamber 20 with the result that the combined spring 46 and viscosity pressure will be less than the pressure in the entrance, causing the valve 36 to be moved to the left and permitting the oil to flow to the heat exchange device 80. The oil flowing through the opening is restricted by the ledge 82 when the valve first opens at a given viscosity. As the viscosity decreases, the valve 36 will tend to move further open and gradually admit more oil to the heat exchange device until the ledge 82 passes the valve seat. Thereafter, for further decrease in viscosity, the area of the opening is rapidly increased with further movement of valve 36 to the left to receive a larger flow of the oil. That portion of the oil passing through the heat exchange device will be increased in viscosity and the valve 36 will be moved back and forth, tending to maintain a ratio of flow through the heat exchange device and valve 38 corresponding to a predetermined viscosity.

What I claim is:

1. In a valve device of the class described, a pair of conduits having a common intake, separate valves for controlling flow through said conduits, a further conduit communicatively connected with said common intake and having a device for establishing a viscosity responsive pressure and operatively associated with one of said valves to regulate the same, the other of said valves serving to limit the pressure at said intake to a predetermined maximum value and including means to compensate for the normal pressure drop increase or decrease with increasing or decreasing flow through said valve to maintain substantially constant the pressure drop across said valve.

2. In a valve device of the class described, three conduits having a common intake, separate valves for controlling flow through two of said conduits, one of said valves operating to prevent flow therethrough when the pressure at the intake is below a predetermined value and a readily removable viscosity plug operatively connecting said intake with the other of said valves for controlling the latter as a function of the viscosity of the fluid flow through said plug.

3. In a valve device of the class described, three conduits having a common intake, separate valves for controlling flow through two of said conduits, one of said valves operating to prevent flow therethrough when the pressure at the intake is below a predetermined value and having means associated therewith to compensate for change in pressure drop thereacross with the change in flow therethrough and a readily removable viscosity plug operatively connecting said intake with the other of said valves for controlling the latter as a function of the viscosity of the fluid flow through said plug.

4. In a valve device of the class described, three conduits having a common intake, separate valves for controlling flow through two of said conduits, one of said valves operating to prevent flow therethrough when the pressure at the intake is below a predetermined value and a readily removable viscosity plug and screen assembly operatively connecting said intake with the other of said valves for controlling the latter as a function of the viscosity of the fluid flow through said plug.

5. In a valve device of the class described, a pair of conduits having a common intake, a poppet valve for controlling the flow of fluid through one of said conduits and for limiting the pressure at the intake to a predetermined maximum value, a fluid pressure actuated valve for controlling the flow of fluid through the other of said conduits, a further conduit communicatively connected with said common intake and having a device for establishing a viscosity responsive pressure to regulate said pressure responsive valve, and means associated with said poppet valve to compensate for the normal pressure drop increase or decrease with increasing or decreasing flow through said valve to maintain substantially constant the pressure drop across the valve.

6. A viscosity plug adapted to be readily communicatively connected with the intake of a viscosity control valve having a fluid flow path for establishing a pressure as a function of the fluid flow through said path and having a further flow path communicatively connected with said first mentioned path at a point therein to enable the utilization of said viscosity pressure.

7. A viscosity controlled unit including a fluid pressure chamber, a substantially constant reaction outlet valve leading therefrom, a spring yieldingly resisting the opening thereof, the resistance of which increases with the valve movement, and a head for said valve, an increasing area of which is exposed to fluid pressure by the opening movement against the increasing tension of the spring, in approximately uniform ratio, and a by-pass from the fluid chamber to the opposite side of the valve through which varying fluid pressure is exerted in accordance with the viscosity thereof to supplement the resistance of the spring to opening movement of the valve.

8. A viscosity controlled unit including a fluid pressure chamber, a fluid pressure controlled outlet valve communicating therewith, an actuating spring therefor, the resistance of which is supplemented by fluctuations of fluid pressure, and the tension of which varies with the movement of the valve, said valve including a head, an increased area of which is subjected to fluid pressure within the chamber by the initial opening movement of the valve to compensate, at least partially, for the increased spring tension incident thereto, and a by-pass duct communicating with the fluid pressure chamber for supplying and relieving fluid pressure upon the valve supplemental to the tension of the spring, the construction and arrangement being such that the flow of fluid through said by-pass varies with the viscosity of the fluid.

9. In a viscosity controlled unit wherein operation of an associated device is governed by fluctuations of back pressure incident to the flow of a fluid of varying viscosity through a metering tube, of means for maintaining the fluid supply to said tube as a substantially constant pressure including a by-pass relief valve, a resistance spring therefor, against the tension of which the relief valve is opened by excess pressure of the fluid supply, a valve seat for the valve, having therein a flow opening through which a reduced portion of the valve is normally exposed to the influence of fluid pressure and normally protecting an additional portion thereof against such fluid pressure, which fluid pressure receiving area is increased by the unseating of the valve and a flaring flange surrounding the valve seat, within which the valve is retractable against the tension of the spring thereby progressively increasing the fluid flow opening of the valve proportionately to its unseating movement.

10. In a viscosity controlled unit, a metering tube through which fluid is forced under a constant supply pressure at varying velocities and tube pressures in accordance with fluctuations of its velocities, and a by-pass relief valve for relieving excessive supply pressure and by-passing fluid under pressure relative to the tube, an actuating spring, against the yielding resistance of which the valve is unseated by fluid pressure, said valve including a valve head increased area of which is exposed to the fluid pressure by the unseating movement of the valve to compensate for increased tension of its actuating spring by such movement.

11. In a viscosity controlled unit, a metering tube through which fluid is forced under a constant supply pressure at varying velocities and tube pressures in accordance with fluctuations of its velocities, and a by-pass relief valve for relieving excessive supply pressure and by-passing fluid under pressure relative to the tube, a valve seat for the relief valve and a flaring flange on said seat surrounding the valve within which the valve is retractable in its opening movement to progressively increase the flow opening past said valve within the flaring flange.

12. In a viscosity controlled unit, a pressure chamber for fluid under pressure, an outlet conduit leading therefrom including a removably mounted tubular member projecting into the pressure chamber and having therein a pair of intercommunicating passages having a common restricted inlet orifice, one of the passages having an outlet for flow of fluid through such passage and the other passage being closed for entrapment of fluid therein subject to back pressure proportionate to that flowing through the companion passage, said restricted orifice being adapted to regulate the flow of fluid proportionately to its viscosity.

13. In a viscosity controlled unit, a friction tube having a passage including restricted orifice through which a fluid flows more or less freely in accordance with varying viscosity thereof, and a branch conduit communicating with the passage through which varying fluid back pressure is exerted in proportion to the viscosity of the fluid flowing through the tube, and pressure operated means controlled by the fluctuations of back pressure through the branch conduit.

14. A viscosity controlled unit including a fluid pressure chamber, fluid pressure controlled valve means controlling the flow of fluid from the chamber, a friction tube removably connected with the fluid pressure chamber and providing an outlet passage therefrom through which the fluid under pressure may escape at different velocities according to the degree of viscosity thereof, and a by-pass duct communicating with the friction tube for passage of fluid for control of said valve means, according to fluctuations of viscosity of the fluid.

15. A viscosity controlled unit including a fluid pressure chamber, fluid pressure controlled valve means controlling the flow of fluid from the chamber, and a Venturi tube removably positioned within the fluid pressure chamber, having therein an outwardly enlarged bore forming a discharge passage from the chamber and a branch duct for passage of fluid for control of the valve means.

16. A viscosity controlled unit including a fluid pressure chamber, fluid pressure controlled valve means controlling the flow of fluid therefrom and a venturi tube projecting into the pressure chamber having an outwardly diverging bore therein affording a discharge passage from the chamber through which the fluid may escape with varying rapidity according to the viscosity thereof, and a branch duct from said passage through which the direction of flow of fluid is alternated by variations of the rate of flow of fluid through the discharge passage to correspondingly vary the valve control pressure.

17. A viscosity controlled unit including an intake chamber for fluid under pressure, an outlet valve communicating therewith, a spring yieldingly urging said valve into closed position, a friction tube communicating with the intake chamber through which fluid under pressure may flow proportionate to the viscosity thereof, at least a portion of which is directed to the opposite side of the valve to supplement the pressure of the spring thereon, the construction and arrangement being such that the valve is subject to varying fluid pressure additional to its spring pressure resisting its opening movement in accordance with fluctuations of viscosity of the fluid

WELDON WORTH.